ered

UNITED STATES PATENT OFFICE.

JOHN F. TIMMONS, OF MARYVILLE, MISSOURI, ASSIGNOR OF ONE-HALF TO WILLIAM A. FEURT, OF SAME PLACE.

COMPOSITION FOR COATING EGGS.

SPECIFICATION forming part of Letters Patent No. 406,549, dated July 9, 1889.

Application filed April 9, 1889. Serial No. 306,600. (No specimens.)

*To all whom it may concern:*

Be it known that I, JOHN F. TIMMONS, a citizen of the United States, residing at Maryville, in the county of Nodaway and State of Missouri, have invented a new and useful Composition of Matter to be Used for the Preservation of Eggs, of which the following is a specification.

My composition consists of the following ingredients, combined in the proportions stated, viz: pure water, one gallon; gum-shellac, two ounces; bicarbonate of soda, three ounces; white glue, one ounce; Spanish whiting, one ounce, these ingredients to be mixed as follows: Heat the water to boiling-point, then add the shellac and soda, stir until dissolved, and add the other ingredients.

In using the above-named composition the eggs should be immersed in the fluid while it is hot and immediately removed. This coats the egg in such a manner that it will keep in a fresh state as long as may be desired.

What I claim, and desire to secure by Letters Patent of the United States, is—

The herein-described composition of matter to be used for the preservation of eggs, consisting of water, gum-shellac, bicarbonate of soda, white glue, and Spanish whiting, in the proportions specified.

JOHN × F. TIMMONS.
his
mark

Witnesses:
   L. N. CRAIG,
   JOHN HERRON.